US006092767A

United States Patent [19]
Schrager

[11] Patent Number: 6,092,767
[45] Date of Patent: Jul. 25, 2000

[54] AUXILIARY BAG HOLDING APPARATUS FOR A BARREL

[76] Inventor: Lawrence A. Schrager, 610 S. 2nd Ave., Highland Park, N.J. 08904

[21] Appl. No.: 09/135,423

[22] Filed: Aug. 17, 1998

[51] Int. Cl.[7] .................................................. A63B 55/08
[52] U.S. Cl. .................................. 248/98; 248/99; 248/95
[58] Field of Search .............................. 248/98, 99, 100, 248/95, 129, 96; 220/908, 908.1; 280/47.24

[56] References Cited

U.S. PATENT DOCUMENTS

| Re. 27,437 | 7/1972 | Bailey | 248/129 |
|---|---|---|---|
| 2,235,182 | 3/1941 | Weston | 248/97 |
| 2,289,695 | 7/1942 | Bryant | 248/129 |
| 2,489,390 | 11/1949 | Stearns | 220/908 |
| 5,316,248 | 5/1994 | Allen | 248/129 |
| 5,351,983 | 10/1994 | Descalo | 280/646 |
| 5,396,885 | 3/1995 | Nelson | 128/204.18 |
| 5,860,659 | 1/1999 | Hart | 280/79.5 |
| 5,947,492 | 9/1999 | Hallberg, Jr. | 280/47.24 |

OTHER PUBLICATIONS

The Bag Connection Inc.,459 sw Ninth St, Dundee, OR 97115 Bagit "Hang–On Rack" brochure.

Ecolab Export GmbH, Reisholzer Werftstrasse 42, D–40552 Duesseldorf, Germany / Mobilette Perfekt brochure.

Primary Examiner—Leslie A. Braun
Assistant Examiner—Kimberly Wood
Attorney, Agent, or Firm—Charles J. Brown

[57] ABSTRACT

Apparatus for supporting a bag on and alongside a barrel wherein an upper frame attachable to the barrel holds an upper opening of the bag, a lower frame attachable to the barrel supports the bottom of the bag, and a spanner element connects the upper and lower frames.

9 Claims, 3 Drawing Sheets

AUXILIARY BAG HOLDING APPARATUS FOR A BARREL

BACKGROUND OF THE INVENTION

This invention concerns auxiliary bag holding apparatus for supporting a bag on the side of a barrel having upper mouth and lower base portions.

In one prior art product of The Bag Connection, Inc. of Dundee, Oregon, U.S.A., an auxiliary bag holding assembly is provided which is limited to an upper frame releasably attachable to a barrel mouth portion. However, that design includes no lower frame and the bag is simply suspended from the upper frame with the weight of its contents borne by the bag alone.

The prior art also includes a product known as the Mobilette Perfekt assembly distributed by Ecolab Export G.m.b.H. of Dusseldorf, Germany. It comprises an upper frame as well as a lower frame for a bag with a wheel assembly on the underside of the lower frame. However, the upper and lower frames are not attachable to a barrel and, more importantly, are not joined directly together as one assembly.

It is the purpose of the present invention to provide auxiliary bag holding apparatus for a barrel having interconnected upper and lower frames with the lower frame releasably encircling the barrel lower portion and with some spanning means connecting the upper and lower frames so that all three together form a unitary assembly.

SUMMARY OF THE INVENTION

In the present invention, an auxiliary bag holding assembly is provided for supporting a bag on and alongside a barrel which has both upper mouth and lower base portions. The upper frame comprises barrel attachment means for releasable attachment to the barrel mouth portion and a rim extending outwardly from the barrel attachment means for holding an upper opening of the bag. In addition a lower frame is included. It includes a strap for releasable encirclement of the barrel lower base portion and a support element extending outwardly with respect to the strap for supporting a bottom of the bag. A wheel assembly is included in the lower frame on the underside of the support element for ground engagement. Directly connecting the upper and lower frames is at least one spanner.

The barrel attachment means may comprise two spaced inverted generally U-shaped brackets adapted to fit over the upper mouth portion of the barrel and a first arm connecting those two brackets. The first arm may be affixed to the brackets and be arcuate to extend around part of the upper mouth portion of the barrel. Preferably the rim is releasably attachable at ends thereof to the respective brackets and is arcuate therebetween. It is extendable beyond the first arm away from the barrel. The strap may comprise two belt elements connected by a buckle.

In its preferred form the lower frame of the assembly comprises two spaced end units and a second arm connecting those two end units. The second arm may be affixed to the end units and be arcuate in shape to extend around part of the lower base portion of the barrel. The support element may be releasably attachable to the respective end units and be extendable beyond the second arm away from the barrel.

A pair of vertical spanner elements is preferably included each connecting the upper frame to the lower frame.

DESCRIPTION OF PREFERRED EMBODIMENT

Figure 1:
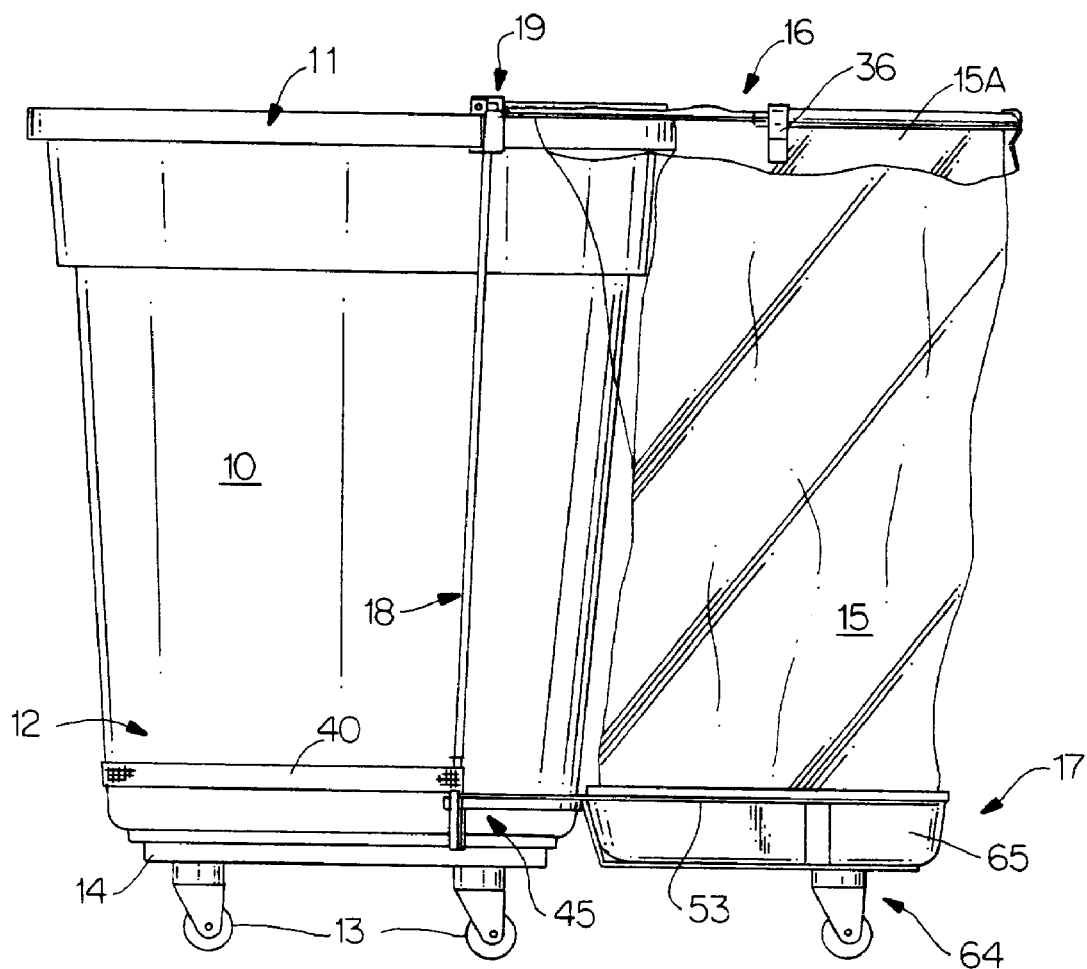
FIG. 1 is a vertical side view of one form of the auxiliary bag holding assembly of the invention attached to a barrel.

Referring first to FIG. 1, a barrel 10 is shown of the conventional form used for trash collection typically in a commercial setting. It has a circular horizontal cross section and includes an upper mouth portion 11 and a lower base portion 12. Four wheel assemblies 13 are secured to the underside of a separate dolly 14 supporting the barrel 10. The dolly 14 mates with the bottom of the base portion 12 of the barrel 10 so that the two are held together in one assembly during use. In many trash collecting processes some waste material must be segregated from the remainder, and for that purpose the present invention provides an assembly for removably mounting an auxiliary bag 15 on the barrel 10 to receive the segregated material. This assembly should be readily detachable as a discrete unit from the barrel 10 and be at least somewhat collapsible for storage when not in use. In accordance with the invention an auxiliary bag holding assembly includes an upper frame 16 and a lower frame 17 connected by a spanner 18. These three basic components of the bag holding assembly of the invention are directly connected to one another to form a unitary assembly.

Figure 2:
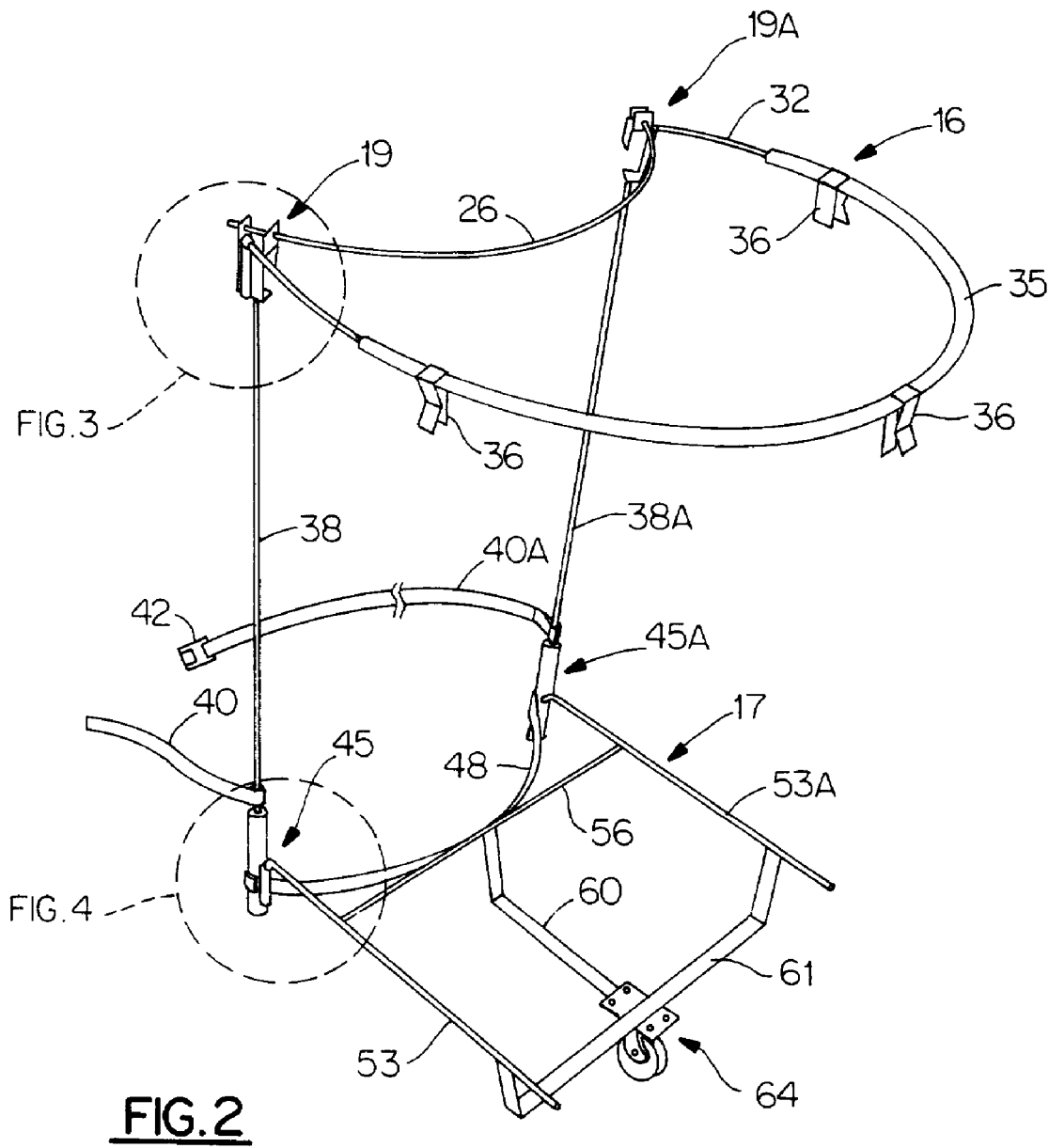
FIG. 2 is a pictorial view of the bag holding assembly separate from the barrel.
Figure 3:
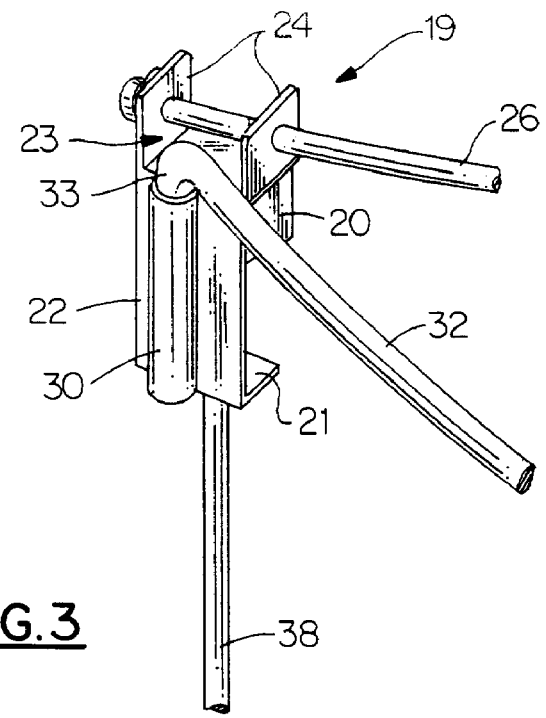
FIG. 3 is an enlarged fragmentary perspective view of one of the brackets of the upper frame and its barrel attachment means together with associated parts.

Referring now particularly to FIGS. 2 to 3, the upper frame 16 includes two spaced inverted generally U-shaped brackets 19 an 19A which are of identical construction and function. The bracket 19 is shown in detail in FIG. 3 consisting of a "C" shaped element having a top and outer lip 20 and lower base 21 joined by an integral connector portion 22. In use, the lip 20 of the bracket fits over the upper edge of the upper mouth portion 11 of the barrel 10. Gravity holds it in place and it may easily be removed simply by lifting it from the edge of the mouth portion 11 of the barrel 10.

On the top of the lip 20 of the bracket 19 is a channel 23 having a pair of upstanding first and second flanges 24 formed with respective coaxial central holes. Each bracket 19 is associated with one of opposite ends of a first arm 26 which is arcuate in shape with approximately the same diameter as the upper mouth portion 11 of the barrel 10. The end of the first arm 26 extends through the holes in the first and second flanges 24 of the associated channel 23. At its extremity the first arm 26 is threaded to receive a securing nut 29.

Attached to the outside of the connector portion 22 of the bracket 19 is a vertical cylindrical socket 30. During assembly an arcuate rim 32, in the form of a curved rod, is mounted by means of a downwardly extending tip 33 at each end thereof held releasably within the associated socket 30.

Since it is the function of the rim 32 to hold open the upper edge of the bag 15, the rim 32 is extendable beyond the first arm 26 away from the barrel 10 as shown particularly in FIG. 2. A rubber sleeve 35 is fitted snugly about the greater part of the length of the rim 32 and a plurality of clips 36 are located on the rubber sleeve 35 to fit about and secure a folded back upper edge 15A of the bag 15 as shown particularly in FIG. 1.

The spanner 18 shown generally in FIGS. 1 and 2 consists of vertical spanner rods 38 and 38A extending downwardly from the respective brackets 19 and 19A. Each spanner rod 38 and 38A may be secured at its upper end by any suitable means to the base 21 of the bracket 19 as shown generally in FIG. 3. The lower end portion of each of the respective vertical spanner rods 38 and 38A extends through an end loop in belt element 40 or 40A, both of which are shown in FIG. 2. The end loop connection between the belt element 40 and the vertical spanner element 38 is shown in detail in FIG. 4. A buckle 42 is located on an end of the belt element 40A remote from the vertical spanner 38A as shown in FIG. 2 for selective attachment to the end of the belt other element 40. In the use of the auxiliary bag holding assembly of the invention, the belt elements 40 and 40A are buckled around the greater part of the lower base portion 12 of the barrel 10 as shown in FIG. 1 when the upper frame 16 is fitted to the upper mouth portion 11 of the barrel 10.

Below the belt elements 40 and 40A on the lower end portions of the vertical spanner rods 38 and 38A are respective end units 45 and 45A of the same structure and function, one of which, end unit 45, is shown in detail in FIG. 4. The end unit 45 includes a cylinder 46 secured about the lower end portion of its associated vertical spanner rod 38. A second arcuate arm 48 extends between the end units 45 and 45A. The extreme end section 49 of the second arm 48 is turned back and attached to the associated cylinder 46.

Figure 4:
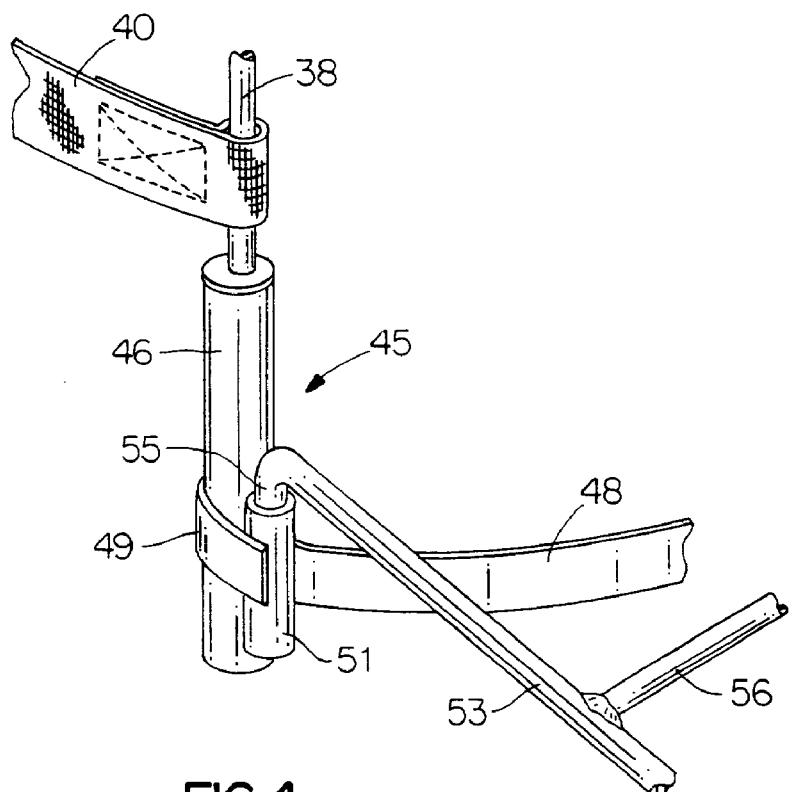
FIG. 4 is an enlarged fragmentary perspective view of one part of the lower frame showing the strap and a portion of the support element for the base portion of the bag.

A cylindrical second socket 51 similar to the first socket 30 is affixed to the outside of the cylinder 46 and vertically arranged as shown in FIG. 4. A pair of straight side bars 53 and 53A extend from the respective end units 45 and 45A as shown in FIG. 2. In FIG. 4 a downward tip 55 is shown extending from the end of the side bar 53 and is fitted within the second socket 51 in the same manner that the tip 33 of the rim 32 is fitted within the first socket 30. The other side bar 53A is removably attached to its associated end unit 45A in similar fashion.

Extending between the side bars 53 and 53A is a straight cross bar 56 shown in FIG. 2. By suitable welds the ends of the cross bar 56 are connected to the side bars 53 and 53A and the center of the cross bar 56 is secured to the second arm 48. A central pan bracket 60 is attached to the center of the cross bar 56 where it is secured to the second arm 48 and, as shown in FIG. 2, the greater part of the pan bracket 60 is below the level of the side bars 53 and 53A. At the outer end of the central pan bracket 60 it is joined to a similar cross pan bracket 61 which extends upwardly at its ends for connection to the respective side bars 53 and 53A. Beneath the connection between the central pan bracket 60 and the cross pan bracket 61 is a wheel assembly 64 similar to the wheel assemblies 13 on the barrel 10. As shown in FIG. 1 a pan 65 rests in the lower frame 17 on the central bracket 60 and cross bracket 61. The pan 65 is of a size to receive the bottom of the bag 15.

In operation the auxiliary bag holding assembly of the invention may be brought from storage in which condition the rim 32 and its associated parts and the side bars 53 and 53A and their associated parts are initially detached. The rim 32 is secured by placing its downward tips 33 in the first sockets 30 and the lower support element is attached by placing the downward tips 55 of its side bars 53 and 53A in the second sockets 51.

The assembly is then fitted to the barrel 10 by dropping the brackets 19 and 19A into place over the edge of the upper mouth portion 11 of the barrel 10 and attaching the belt elements 40 and 40A together by their buckle 44 around the lower base portion 12 of the barrel 10. Next the pan 65 is put in place on the brackets 60 and 61. A plastic bag 15 is opened and its lower end is placed in the pan 65. An upper edge portion 15A of the bag 15 is folded back over the rubber sleeve 35 about the rim 32 and held in place by the clips 36. To further secure the bag 15 in place, one section of the upper edge of the bag may be inserted between the first arm 26 and the barrel 10.

In many uses of the assembly of the invention the first arm 26, the second arm 48 and their interconnecting spanner rods 38 and 38A may be mounted to one of the barrels 10 at all times. The rim 32 and the lower support element with its wheel assembly 64 and their associated parts are then brought from storage for initial attachment to those other parts on the barrel 10.

While the greater part of the collected trash may be placed in the barrel 10, those components which must be separated are easily dropped into the bag 15. The wheel assembly 64 beneath the lower support element allows the barrel 10 and the auxiliary bag holding assembly of the invention to be rolled together by pushing or pulling or spinning in the manner of a single barrel.

The scope of the invention is to be determined by the following claims rather than by the foregoing description of preferred embodiment.

What is claimed is:

1. An auxiliary bag holding assembly for supporting a bag on and alongside a barrel of circular cross section having circular upper mouth and lower base portions comprising
    a) an upper frame comprising
        i. two spaced inverted generally U-shaped brackets adapted to fit over the upper mouth portion of the barrel and an arcuate first arm affixed to the two brackets, and
        ii. an arcuate rim releasably attachable at ends thereof to the respective brackets and extendable beyond said first arm away from the barrel;
    b) a lower frame comprising
        i. a strap for releasable encirclement of the barrel lower base portion comprising two belt elements connected by a buckle,
        ii. two spaced end units,
        iii. an arcuate second arm affixed to and extending between the two end units,
        iv. a support element releasably attachable to the respective end units and extendable beyond said second arm away from said barrel for supporting a bottom of the bag, and
        v. a wheel assembly on the underside of the support element for ground engagement; and
    c) a pair of vertical spanners each connecting the upper frame to the lower frame.

2. In combination with a barrel having an upper mouth portion and a lower base portion and a container alongside said barrel, an auxiliary container holding assembly for supporting the container on and alongside the barrel comprising
    a) an upper frame comprising
        i. barrel attachment means for releasable attachment of the upper frame to an upper edge of the barrel upper mouth portion, comprising at least one inverted generally U-shaped bracket fitting over the upper mouth portion of the barrel and
        ii. an element extending outwardly from the barrel attachment means for holding an upper opening of the container;
    b) a lower frame comprising
        i. a strap for releasable encirclement of the barrel lower base portion, ii. a support element extending outwardly with respect to the strap for supporting a bottom of the container, exclusive of the barrel, and iii. a wheel assembly on and exclusively beneath the underside of the support element for ground engagement beneath the container exclusive of the barrel; and c) at least one spanner directly connecting the upper and lower frames.

3. An auxiliary bag holding assembly for supporting a bag on and alongside a barrel having an upper mouth portion and a lower base portion comprising a) an upper frame comprising i. barrel attachment means for releaseable attachment of the upper frame to the barrel mouth portion comprising two spaced inverted generally U-shaped brackets adapted to fit over the upper mouth portion of the barrel and a first arm connecting the two brackets, and ii. a rim extending outwardly from the barrel attachment means for holding an upper opening of the bag;

b) a lower frame comprising i. a strap for releasable encirclement of the barrel lower base portion, ii. a support element extending outwardly with respect to the strap for supporting a bottom of the bag, and iii. a wheel assembly on the underside of the support element for ground engagement; and c) at least one spanner directly connecting the upper and lower frames.

4. An auxiliary bag holding assembly according to claim 3 wherein the first arm is affixed to the brackets and is arcuate to extend around part of said upper mouth portion of the barrel.

5. An auxiliary bag holding assembly according to claim 3 wherein the rim is releasably attachable at ends thereof to the respective brackets and is arcuate therebetween and extendable beyond said first arm away from the barrel.

6. An auxiliary bag holding assembly for supporting a bag on and alongside a barrel having an upper mouth portion and a lower base portion comprising a) an upper frame comprising i. barrel attachment means for releaseable attachment of the upper frame to the barrel mouth portion, and ii. a rim extending outwardly from the barrel attachment means for holding an upper opening of the bag; and b) a lower frame comprising i. a strap for releasable encirclement of the barrel lower base portion, ii. a support element extending outwardly with respect to the strap for supporting a bottom of the bag, iii. two spaced end units and a second arm connecting the two end units for holding the support element, and iv. a wheel assembly on the underside of the support element for ground engagement; and c) at least one spanner directly connecting the upper and lower frames.

7. An auxiliary bag holding assembly according to claim 6 wherein the second arm is affixed to the end units and is arcuate to extend around part of said lower base portion of the barrel.

8. An auxiliary bag holding assembly according to claim 6 wherein the support element is releasably attachable to the respective end units and extendable beyond said second arm away from the barrel.

9. An auxiliary bag holding assembly according to claim 6 wherein a pair of vertical spanner elements are included each connecting the upper frame to the lower frame.

* * * * *